Aug. 11, 1936.  E. G. OPPENHEIM  2,050,855
CORD OR CABLE TERMINAL
Filed April 12, 1935
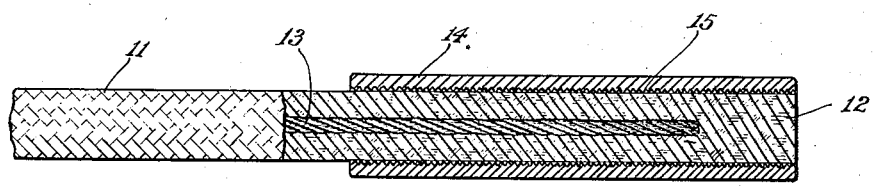
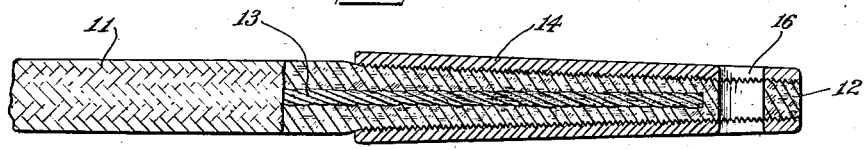
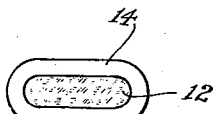
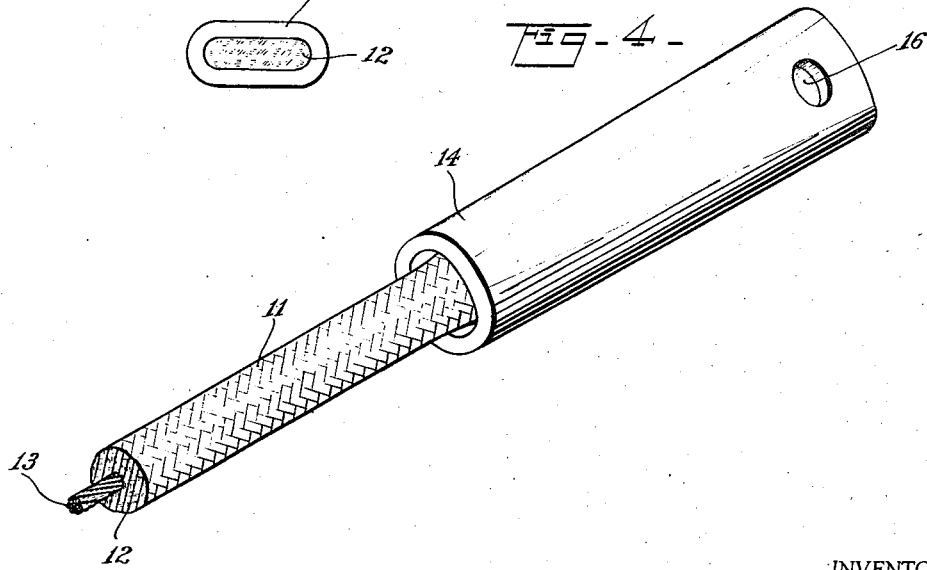
INVENTOR.
Earl G. Oppenheim
BY
ATTORNEY.

Patented Aug. 11, 1936

2,050,855

UNITED STATES PATENT OFFICE 2,050,855

CORD OR CABLE TERMINAL

Earl G. Oppenheim, Trenton, N. J., assignor to John A. Roebling's Sons Company, Trenton, N. J., a corporation of New Jersey Application April 12, 1935, Serial No. 15,998

2 Claims. (Cl. 24—129)

This invention relates to cord or cable terminals.

While the invention is applicable to various types of metal center cords of the type comprising a wire strand center and braided cover of cotton or other fibre, it is particularly adaptable to cords or cables employed for signal or register apparatus, brake and steering connections, for use as connections in loom harness and many other uses, where considerable strength and little or no stretching is required.

It is an object of the invention to provide a cord terminal of maximum strength and efficiency.

With this general object and others in view, the invention consists in the construction and combinations of parts that will first be described in connection with the accompanying drawing and then more particularly pointed out in the claims.

In the drawing,—

Figure 1 is a longitudinal sectional view of a cord terminal of preferred type constructed in accordance with the invention, showing the terminal before compression;

Figure 2 is a similar view after compression;

Figure 3 is an end view of the dead end of the completed terminal, and

Figure 4 is a perspective view of the same.

Referring to the drawing, the terminal comprises a cord end and a ferrule thereon. While the cord may vary in construction, the cord 11 here shown as an example is composed of braided fabric 12 over a core or center 13 in the form of a strand of wires of steel or other suitable material.

The end of cord 11 is embraced by and anchored in a tubular ferrule 14. The end of the terminal where the cord enters the ferrule may be termed the live end and the other end may be termed the dead end.

In accordance with the present invention, the ferrule is compressed on the enclosed end of the cord in such a manner that the degree or extent of compression varies progressively from a minimum at the live end of the terminal to a maximum at the dead end. This may be accomplished, for example, by inserting the end of the cord in a cylindrical tube and then so applying pressure to the assembled parts that the tube is flattened in two opposing faces that converge toward each other in the direction of the dead end of the terminal (Figure 2). In other words, the dead end of the terminal (Figure 3) has a relatively great flattening or compression and the live end has a lesser flattening or compression. Putting it another way, the ferrule of the final terminal has a tapered cross section in one plane (Figure 2) and an untapered or less tapered cross section in a plane at right angles thereto.

While the ferrule may vary in construction and relative dimensions, the dimensions shown have been found very satisfactory for many uses, that is, the wall thickness, before compression, being about one fourth the inside diameter and the length about seven times the cord diameter. The size of the cord may vary, of course, in accordance with the use desired, but the sizes most in use vary from ⅛ to ⅜ inch diameter.

A ferrule may be used having an inner bore roughened or serrated to provide a firm grip on the cord. This may conveniently be accomplished by threading the bore of the ferrule, such a thread being indicated at 15. The thread crests, when the ferrule is flattened, bite into the cord fabric and increase the gripping efficiency.

The invention in its entirety includes provision for attachment of the terminal. While the attaching means may vary, in the embodiment here shown as an example, near the dead end of the terminal is a hole 16 which serves as an attaching eye. This hole may conveniently be drilled after the ferrule has been compressed on the cord.

With the construction described, a high degree of efficiency is attained. The anchoring force is distributed gradually throughout the length of the terminal instead of being limited to or concentrated at the point of entrance of the cord, as would be the case if the ferrule had a uniform degree of compression throughout its length. As a result, danger of damage to the cord at the entrance end is entirely or largely eliminated, and the full strength of the cord is secured in the terminal attachment. The stretching of the braid under tension produces gripping of the wire center by the braid and the wire center finally takes up the load.

What is claimed is:

1. A cord terminal comprising, in combination with the end of a cord comprising a wire center and fibre covering, a hollow ferrule embracing the end of the cord and compressed thereon, the extent of compression progressively varying throughout the length of the ferrule from a minimum at the live end of the terminal to a maximum at the dead end.

2. A cord terminal comprising, in combination with the end of a cord comprising a wire center and a braided fabric covering, a hollow ferrule embracing the end of the cord and compressed thereon, the extent of compression progressively varying throughout the length of the ferrule from a minimum at the live end of the terminal to a maximum at the dead end.

EARL G. OPPENHEIM.